(12) United States Patent
Ghyme

(10) Patent No.: US 9,706,187 B2
(45) Date of Patent: Jul. 11, 2017

(54) CAMERA RIG FOR SHOOTING MULTI-VIEW IMAGES AND VIDEOS AND IMAGE AND VIDEO PROCESSING METHOD FOR USE WITH SAME

(71) Applicant: ELECTRONICS AND TELECOMMUNICATIONS RESEARCH INSTITUTE, Daejeon (KR)

(72) Inventor: Sang-Won Ghyme, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 14/854,207

(22) Filed: Sep. 15, 2015

(65) Prior Publication Data

US 2016/0100154 A1    Apr. 7, 2016

(30) Foreign Application Priority Data

Oct. 6, 2014   (KR) .................. 10-2014-0134012
Jun. 3, 2015   (KR) .................. 10-2015-0078315

(51) Int. Cl.
H04N 5/225       (2006.01)
H04N 13/02      (2006.01)
H04N 13/00      (2006.01)

(52) U.S. Cl.
CPC ..... *H04N 13/0242* (2013.01); *H04N 13/0025* (2013.01); *H04N 13/0246* (2013.01); *H04N 13/0282* (2013.01); *H04N 13/0296* (2013.01); H04N 13/0037 (2013.01); H04N 2213/001 (2013.01)

(58) Field of Classification Search
CPC .... H04N 5/345; H04N 5/2251; H04N 5/2252; G03B 37/00
USPC ....................... 348/218.1, 239, 373
See application file for complete search history.

(56) References Cited

U.S. PATENT DOCUMENTS

| | | | | |
|---|---|---|---|---|
| 5,175,616 | A * | 12/1992 | Milgram ................ | G03B 35/08 348/47 |
| 5,659,323 | A * | 8/1997 | Taylor .................. | G03B 19/026 348/159 |
| 6,354,750 | B1 * | 3/2002 | Romanoff ............. | G03B 17/00 248/183.2 |
| 6,535,226 | B1 * | 3/2003 | Sorokin ................ | H04N 7/181 345/427 |
| 7,990,467 | B2 * | 8/2011 | Shirakura ............ | H04N 13/021 348/373 |
| 9,123,172 | B2 * | 9/2015 | Sebring ................ | G06T 15/205 |
| 2002/0190991 | A1 * | 12/2002 | Efran ................... | H04N 5/2224 345/475 |

(Continued)

FOREIGN PATENT DOCUMENTS

| | | |
|---|---|---|
| KR | 10-2012-0039970 A | 4/2012 |
| KR | 10-1165223 B1 | 7/2012 |
| KR | 10-2014-0105981 A | 9/2014 |

*Primary Examiner* — Kelly L Jerabek
(74) *Attorney, Agent, or Firm* — LRK Patent Law Firm

(57) ABSTRACT

A camera rig for shooting multi-view images and videos includes a plurality of cam sockets, a plurality of cam mounts for fixing a plurality of cameras to the respective cam sockets, and an adjustment unit that adjusts the cam sockets such that all of the cameras are directed to a subject.

6 Claims, 9 Drawing Sheets

(56) References Cited

U.S. PATENT DOCUMENTS

2010/0289881 A1* 11/2010 Xu .................. H04N 5/23238
                                                    348/47
2013/0155183 A1    6/2013  Park et al.
2014/0118501 A1    5/2014  Kim et al.
2014/0118557 A1    5/2014  Lee et al.

* cited by examiner

CAMERA RIG FOR SHOOTING MULTI-VIEW IMAGES AND VIDEOS AND IMAGE AND VIDEO PROCESSING METHOD FOR USE WITH SAME

CROSS REFERENCE TO RELATED APPLICATION(S)

This application claims the benefit of Korean Patent Application Nos. 10-2014-0134012 and 10-2015-0078315, filed on Oct. 6, 2014 and Jun. 3, 2015, respectively, which are hereby incorporated by reference in its entirety into this application.

BACKGROUND OF THE INVENTION

1. Technical Field

The present invention generally relates to a camera rig for shooting multi-view images and videos and, more particularly, to a camera rig for shooting multi-view images and videos that is capable of simultaneously adjusting directions of multiple cameras and to an image and video processing method for use with the same.

2. Description of the Related Art

To obtain images and videos from three or more viewpoints, rigs are attached to respective cameras and are used to adjust intervals and directions of the cameras.

According to related arts, camera rigs are individually controlled. Therefore, as the number of cameras is increased, control of the camera rigs becomes more burdensome.

For this reason, a camera rig that can simultaneously adjust directions of a plurality of cameras is needed to easily obtain multi-view images and videos when a large number of cameras are used.

Furthermore, when camera rigs are used to control cameras, mechanical errors are likely to occur. The mechanical errors impair the three-dimensional effect of images and videos. Therefore, such errors need to be automatically corrected through image and video processing.

That is, when producing multi-view three-dimensional images and videos using many cameras, all of the cameras need to be directed to a subject. According to related arts, all camera rigs attached to respective cameras need to be individually adjusted such that the cameras are directed to a subject. Therefore, it takes a long time and requires special skills to obtain multi-view images and videos according to the related arts.

That is, when shooting a three-dimensional image and video, all cameras need to be directed to a subject. Furthermore, when the subject is changed, arrangement of the cameras has to be changed. Operation of rearranging the cameras every time when the subject is changed is very complicated and time-consuming.

In order to visualize a three-dimensional image and video using a glass-free display, images and videos captured from many directions are needed. That is, a front image and video are needed when viewing an image and video from the front side of a glass-free display and a side image and side video are needed when viewing an image and video from the left or right side of a glass-free display.

When shooting a three-dimensional image and video, arrangement of cameras is very important. A common area in images and videos shot by all cameras is used to generate a three-dimensional image and video and the remaining areas of the shot images and videos are discarded. Accordingly, cameras are arranged to maximally increase the common area. As the distance to a subject is decreased, it is necessary to maximize the common area by arranging the cameras to be directed to the subject.

When a person views an object, as the distance to the object is decreased, the pupil of the person's eye is more focused to the center. When only two cameras are used to shoot a three-dimensional image and video, it is sufficient that the cameras are panned in place, which is a method similar to human eyes, according to the distance to an object. However, when a plurality of cameras K more than two is used, as illustrated in FIG. 1, the cameras need to be moved as well as panned at the same time.

If the cameras are not moved but only panned to be directed to a subject A, since the distances between the subject A and the cameras vary from camera to camera, images and videos shot by the cameras may also vary. Therefore, a common area in the shot image and video are decreased.

When camera rigs with a simple structure are used, a user has to individually adjust each of the camera rigs by calculating positions and directions of the cameras for precise and accurate arrangement of the cameras. Therefore, a user has to perform complicated and burdensome tasks for arrangement of the cameras.

That is, the cameras have to be arranged in the following manner so that they are equidistant from the subject and from each other.

First, distances between each camera and a subject are measured. Next, a circle having the center on the subject and a diameter corresponding to the distance between the camera and the subject is imagined. Imaginary cameras are arranged along the imaginary circuit to be at regular intervals from each other. Next, positions and directions of the imaginary cameras are calculated. Next, camera rigs for the respective cameras are adjusted so that the cameras can be arranged at the calculated positions.

Such arrangement work has to be repeated every time a subject is changed.

Such complicated arrangement work using the simple-structure camera rigs impedes shooting of three-dimensional images and videos. For this reason, currently available three-dimensional images and videos are shot using only two or three cameras to avoid such burdensome and complicated camera arrangement work. In addition, in order to produce three-dimensional images and videos on a glass-free display that typically requires multi-view images and videos for production of a three-dimensional image and video with use of only two- or three-viewpoint images and videos, intermediate-view images and videos are generated. However, generation of intermediate-view images and videos incurs additional cost and the intermediate-view images and videos are not quality images and videos.

As the number of viewpoints from which a subject is shot is increased, the number of used cameras is correspondingly increased. Therefore, a large complicated camera rig that can surround a subject is needed. This camera rig has problems that it takes a long time to install and it is difficult to carry.

In connection with this, Korean Patent No. 1165223 discloses a technology related to "Horizontal-type Stereoscopic Camera Rig" and United States Patent Application Publication No. 2014-0118501 discloses a technology related to "Calibration System for Stereo Camera and Calibration Apparatus for Calibrating Stereo Image"

SUMMARY OF THE INVENTION

Accordingly, the present invention has been made keeping in mind the above problems occurring in the prior art, and an object of the present invention is to provide a camera rig for shooting multi-view images and videos that is capable of easily and promptly shooting multi-view images and videos by simultaneously adjusting arrangement of all cameras to adjust distances between a subject and each camera using a wheel. Another object of the invention is to provide an image and video processing method for use with the same camera rig.

According to one aspect, a camera rig for shooting multi-view images and videos, include: a plurality of cam sockets; a plurality of cam mounts for fixing cameras to the respective cam sockets; and an adjustment unit for adjusting the cam, sockets such that all the cameras are directed to a subject.

The adjustment unit may include a stepping motor that is connected to each of the cam sockets to rotate the cam sockets, an operation unit that determines a distance between the subject and each camera based on a rotation amount thereof, and a controller that controls a rotation amount of the stepping motor by detecting the rotation amount of the operation unit.

The operation unit may include a wheel a rotation amount of which is adjusted by a user, wherein the rotation amount of the wheel is converted into a distance between the subject and the camera that is sent to the controller as an input signal.

The controller may calculate a rotation amount of the cam socket based on the input signal that represents the distance between the subject and camera so that the camera turns to be directed to the subject, and rotates the stepping motor connected to the cam socket by the calculated rotation amount.

The adjustment unit may include a bow body that is elastically deformable, and the cam sockets may be arranged at regular intervals along a first surface of the bow body. Only one-side surfaces of the respective cam sockets may be fixed to the first surface of the bow body so that the intervals between the cam sockets can be adjusted according to deformation of the bow body.

The adjustment unit may include a rotation rod that is rotated by the operation unit, a moving body that is attached to a middle portion of the bow body and engaged with the rotation rod so as to move along the rotation rod when the rotational road rotates, and semi-fixed bodies that are semi-fixed to respective ends of the bow body and assist the bow body to bend when the moving body moves.

The adjustment unit may include latches mounted to the respective ends of the bow body, a bowstring fastened to the latches, a rotation rod that is connected to a middle portion of the bowstring to adjust tension of the bowstring, and an, operation unit that transfers rotational motion to the rotation rod.

According to another aspect, an image and video processing method includes: shooting multi-view images and videos using a multi-view image and video shooting camera rig; and correcting information of the multi-view images and videos obtained through the shooting of the multi-view images and videos.

The shooting of the multi-view images and videos may include: shooting multi-view synchronization images and videos using a slate to indicate a start and an end of shooting; shooting multi-view camera calibration images and videos by shooting a chessboard with a predetermined size at various positions and from various distances; and shooting normal images and videos.

The correcting of the information may include any one of the following: synchronizing multi-view images and videos by analyzing the multi-view synchronization images and videos; producing aligned multi-view images and videos by analyzing the multi-view camera calibration images and videos that are shot; correcting colors of the aligned images and videos; and adjusting intervals of the aligned images and videos.

The image and video processing method may further include cutting away areas other than a common area within the corrected images and videos and enlarging the common area.

The camera rig according to the present invention has an advantage of easily and promptly obtaining multi-view images and videos by simultaneously adjusting arrangement of a plurality of cameras. Accordingly, three-dimensional video content based on multi-view images and videos can be produced at low cost.

In addition, since it is possible to simultaneously adjust arrangement of all cameras, image and video processing may include only (minimally) a simple calibration process for correction of images and videos. Therefore, multi-view images and videos can be easily and promptly obtained.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
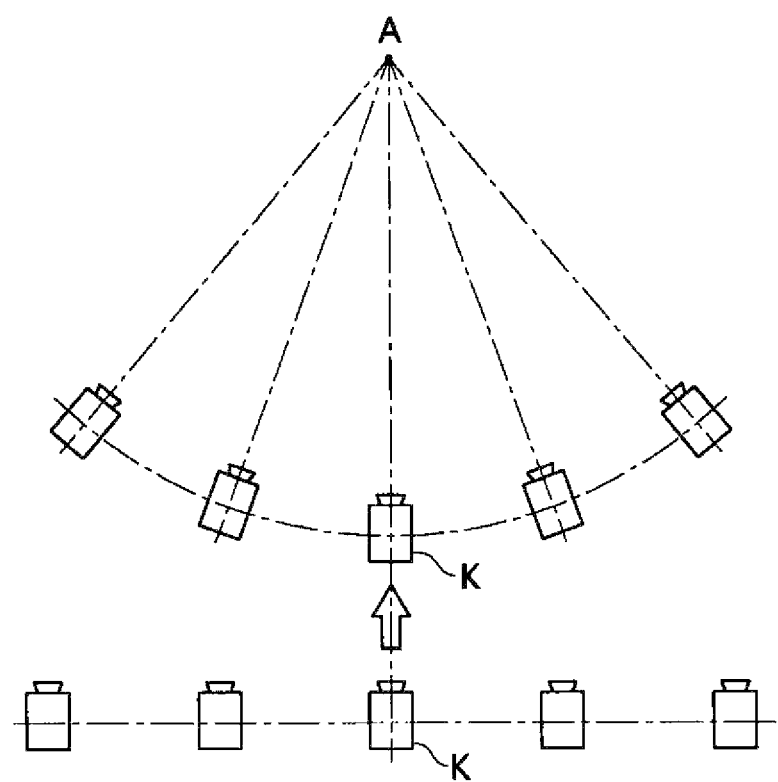
FIG. 1 is a diagram illustrating a state in which two or more cameras need to be simultaneously moved and/or rotated.

The present invention will be described in detail below with reference to the accompanying drawings. Repeated descriptions and descriptions of known functions and configurations that have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

A camera rig for shooting multi-view images and videos according to the present invention arranges all cameras to face a subject when capturing a stereoscopic image and video and can simultaneously change arrangement of all the cameras such that all the cameras still face the subject through a simple adjustment operation every time the subject is changed.

Figure 2:
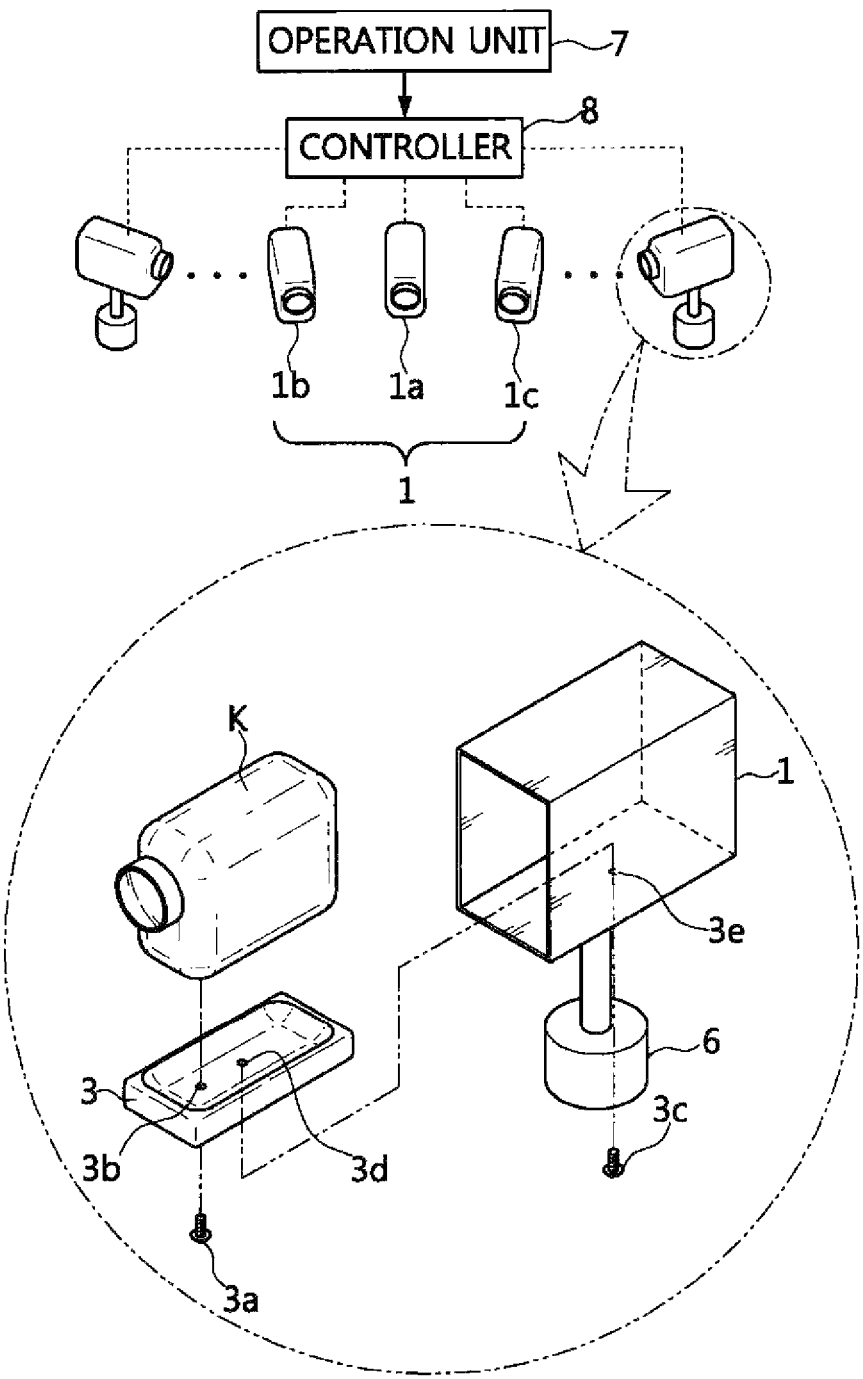
FIG. 2 is a diagram illustrating the configuration of a camera rig for shooting multi-view images and videos according to a first embodiment of the present invention.

As illustrated in FIG. 2, a camera rig for capturing multi-view images and videos according to a first embodiment includes cam sockets 1, cam mounts 3, and an adjustment unit.

The cam sockets 1 consist of a plurality of cam sockets 1 for a plurality of cameras K for capturing a three-dimensional image and video.

The cam sockets 1 consist of a central cam socket 1a, one or more left cam sockets 1b that is arranged on the left side of the central cam socket 1a, and one or more right cam sockets 1c that are arranged on the right side of the central cam socket 1a.

The cam mounts 3 fix the cameras K to the respective cam sockets 1. The cam mounts 3 are arranged between the camera K and the cam sockets 1 and fix the cameras K to the respective cam sockets 1, thereby enabling easy attachment and detachment of the cameras K.

Each of the cam mounts 3 has a first hole 3b to be engaged with a first bolt 3a that couples the cam mount 3 to the camera K and a second hole 3d to be engaged with a second bolt 3c that couples the cam mount 3 and the cam socket 1 to the camera K. Therefore, the camera K, the cam mount 3, and the cam socket 1 can be easily coupled to one another.

Fixation of the camera K using the cam mount 3 is achieved by first arranging the cam mount 3 on a lower surface of the camera K, coupling the cam mount 3 to the camera K by inserting the first bolt 3a into the first hole 3b of the cam mount 3, arranging the camera K to which the cam mount 3 is coupled in an internal space 2 of the cam socket 1, aligning the second hole 3d of the cam mount 3 with a mount hole 3e of the cam socket 1, and inserting the second bolt 3c to pass through both of the second hole 3d and the mount hole 3e. At this point, a camera lens is preferably arranged in a position corresponding to an opening of the cam socket 1 so that an image and video can be captured by the camera K.

The adjustment unit is used to rotate the cam sockets 1. The adjustment unit can rotate the left cam socket 1b and the right cam socket 1c with respect to the central cam socket 1a by a predetermined angle.

The adjustment unit includes a stepping motor 6, an operation unit 7, and a controller 8.

The stepping motor 6 is connected to the cam sockets 1, thereby rotating the cam sockets 1.

The operation unit 7 determines a distance between a subject A and each camera K based on a rotation amount thereof. The operation unit 7 includes a wheel, a rotation amount of which is operated by a user. The operation unit 7 converts the rotation amount of the wheel into the distance between the subject A and the camera K and sends the distance to the controller 8 as an input signal.

The controller 8 detects the rotation amount of the operation unit 7 and controls the rotation amount of the stepping motor.

That is, the controller 8 controls the rotation amount of the stepping motor 6 to rotate the left and right cam sockets 1b and 1c with respect to the central cam socket 1a, thereby directing the cameras K mounted to the respective cam sockets 1 to a target.

Figure 3:
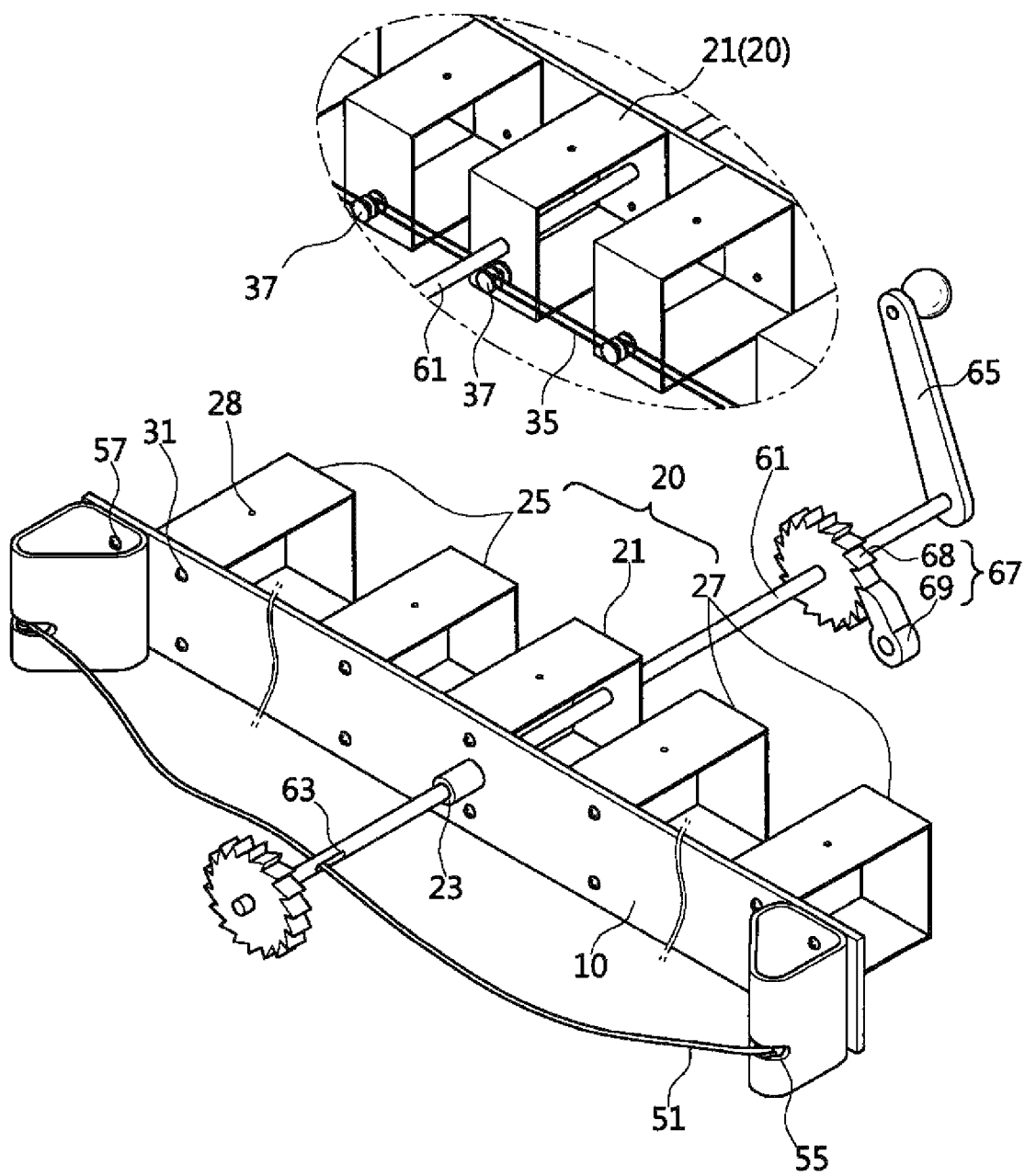
FIG. 3 is a perspective view illustrating a camera rig for shooting multi-view images and videos according to a second embodiment of the present invention.
Figure 4:
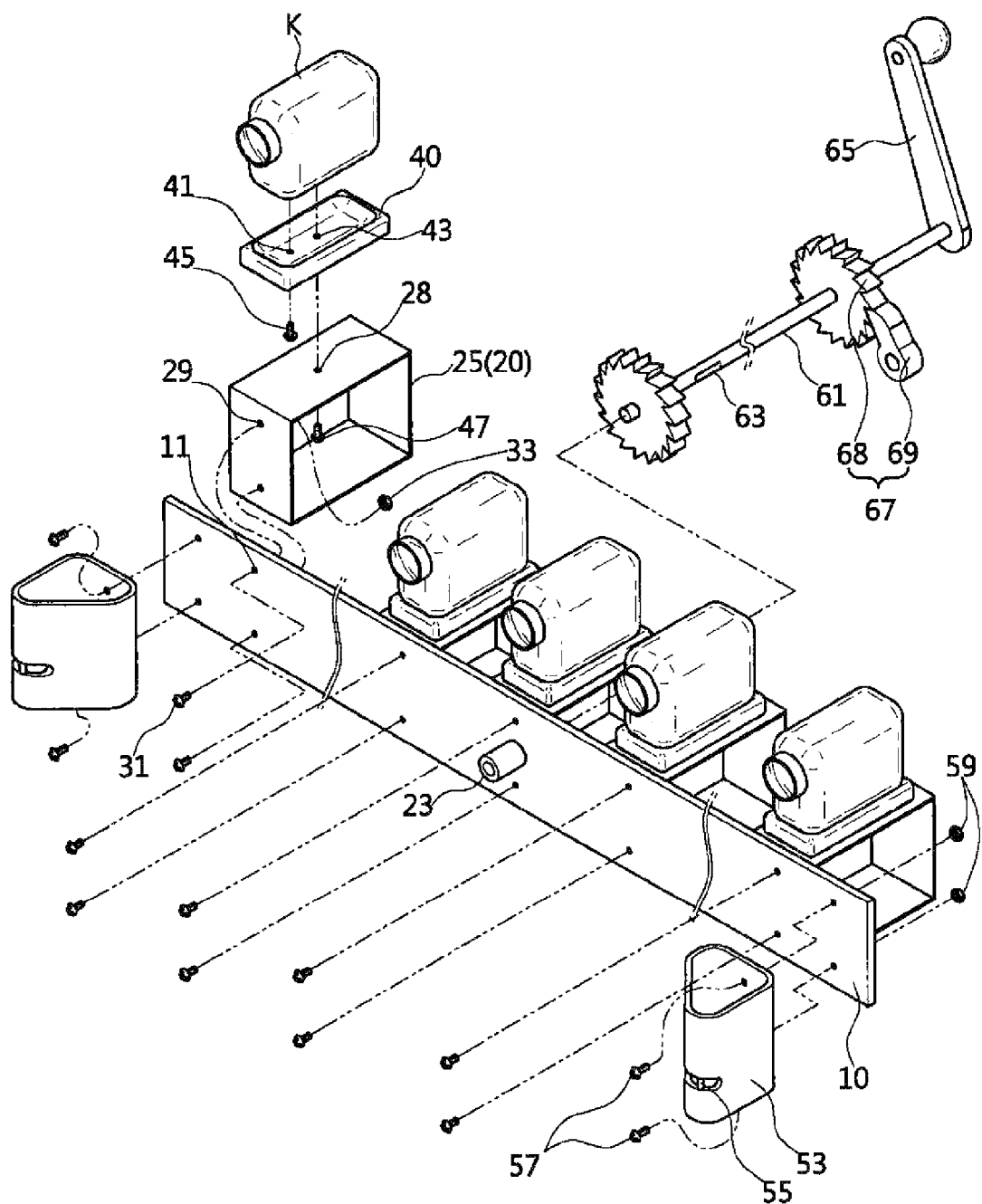
FIG. 4 is an exploded perspective view illustrating the camera rig of FIG. 3.
Figure 5:
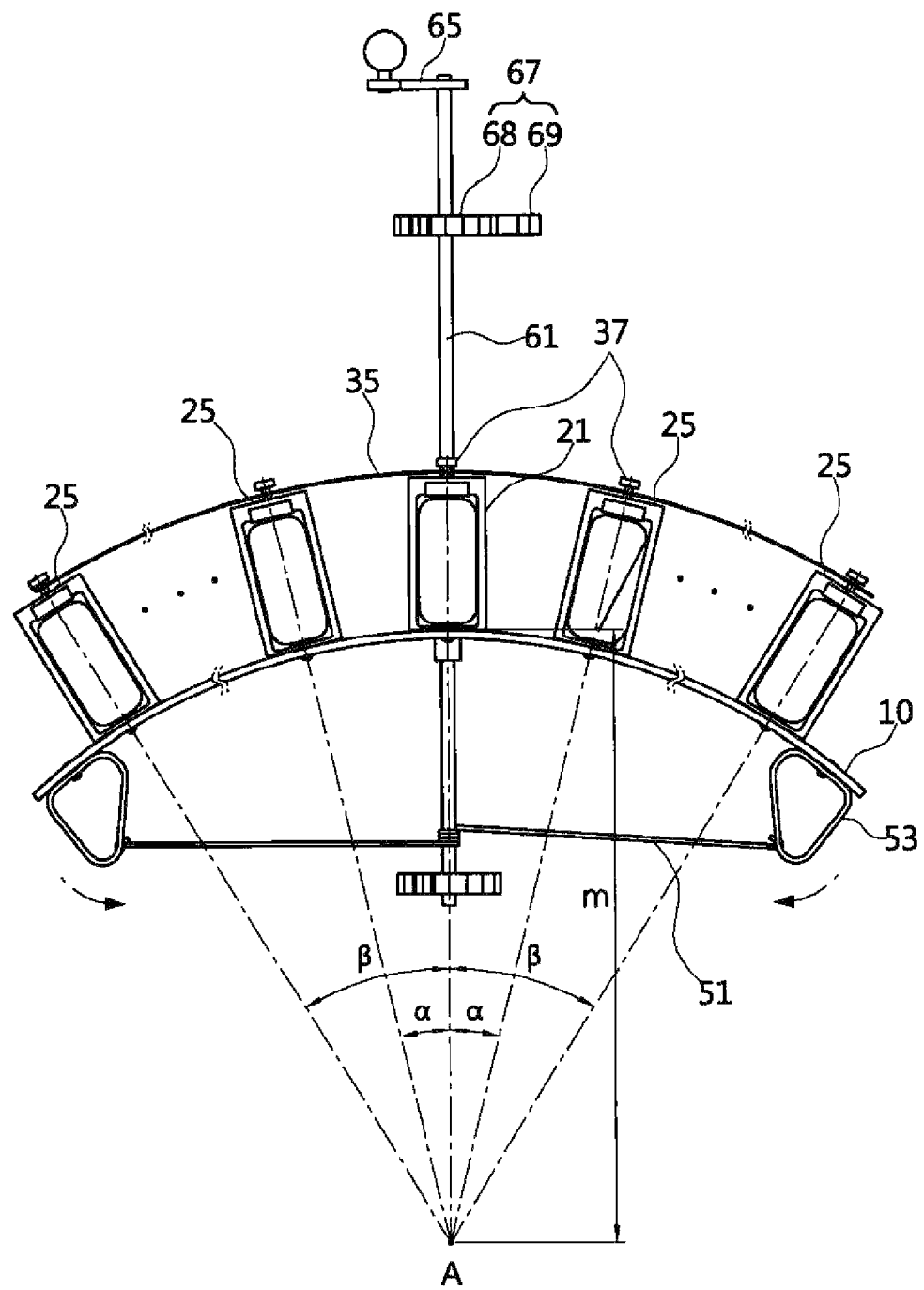
FIG. 5 is a plan view illustrating a state in which the camera rig of FIG. 3 is operating.

A camera rig for shooting multi-view images and videos according to a second embodiment includes a bow body 10, cam sockets 20, cam mounts 40, and an adjustment unit, as illustrated in FIGS. 3 through 5.

The bow body 10 is bent or stretched after cameras K are mounted to the bow body 10. In this way, a camera arrangement operation of directing the cameras K to a subject A is automatically performed. The bow body 10 has an elongated plate shape and is made of an elastic material so that it can be bent and stretched.

A plurality of cam sockets 20 is installed on one surface of the bow body 10. The cam sockets 20 can be fixed to the surface of the bow body 20 using bolts and nuts.

For example, fixing holes 11 are formed in the bow body 10 and coupling holes 29 are formed in the cam sockets 10. After that, the fixing holes 11 in the bow body 19 and the coupling holes 29 in the cam sockets 20 are aligned with each other, and the bolts 31 are inserted into the fixing holes 11 and the coupling holes 29. Next, ends of the bolts are engaged with nuts 33.

The cam sockets 20 are divided into a central cam socket 21 that is arranged in a middle portion of the surface of the bow body 10, one or more right cam sockets 27 arranged on the right side of the central cam socket 21, and one or more left cam sockets 25 arranged on the left side of the central cam socket 21.

Among the cam sockets 20, only the central cam socket 21 arranged at the middle portion of the bow body 10 is fixed to a housing (not shown) that supports the bow body 10. However, the remaining cam sockets (left cam sockets 25 and right cam sockets 27) are not fixed so that these cam sockets 25 and 27 can move according to deformation of the bow body 10.

The cam sockets 20 are arranged at regular intervals on one surface of the bow body 10, and only one surface (first surface) of each cam socket 20 is fixed to the bow body 10 so that the intervals of the cam sockets 20 can be adjusted according to deformation of the bow body 10.

Surfaces (second surfaces) of the cam sockets 20 that are opposite to the surfaces to which the cam sockets 20 are attached are connected to one another using a rubber band 35 in order to prevent the left and right cam sockets 25 and 27 from moving toward each other and to assist the bow body 10 to be elastically restored. The rubber band 35 restrains the cam sockets 20 from moving too far away from each other and assists the bow body 10 to be elastically restored. To this end, second surfaces of the cam sockets 20 are provided with respective hangers 37 with which the rubber band 35 is to be engaged.

The cam mounts 40 fix the cameras K to the respective cam sockets 20. The cam mounts 40 are arranged between the cameras K and the cam sockets 20 and fix the cameras K to the respective cam sockets 20. Therefore, the cameras K can be easily attached to and detached from the respective cam sockets 20.

The cam mounts 40 are provided with first holes 41 to be engaged with first bolts 45 to couple the cam mounts 40 and the respective cameras K to each other and second holes 43 to be engaged with second bolts 47 to couple the cam mounts 49 and the cam sockets 20 to the respective cameras K. Therefore, the cameras K, the cam mounts 40, and the cam sockets 20 are easily coupled to one another. The cam sockets 20 are provided with mount holes 28 to be aligned with the second holes 43 of the cam mounts 49 and to be engaged with the second bolts 27.

The adjustment unit elastically deforms (or bends) the bow body 10 such that the cameras K are directed to a subject and arranged to be equiangular with each other.

The adjustment unit includes a bowstring 51, latches 53, a rotation rod 61, and an operation unit 65.

Respective ends of the bowstring 51 are fixed to the latches 53.

The latches 53 are fixed to respective ends of the bow body 10. The latches 53 are used to firmly fix the bowstring 51 to the bow body 10. The latches 53 are fixed to the respective ends of the bow body 10 using bolts 57 and nuts 59. Each of the latches 53 has a string-engaging portion 55 to which the bowstring 51 can be tied. Therefore, the bowstring 51 can be fixed to the bow body 10 at its respective ends thereof.

The rotation rod 61 is connected to a middle portion of the bowstring 51 to adjust the tension of the bowstring 51.

The rotation rod 61 has a bar shape and is installed to pass through the central cam socket 21 and the bow body 10. That is, the rotation rod 61 may be installed to be inserted into a through hole 23 extending through the bow body 10 and the middle portion of the central cam socket 21. The through hole 23 has a diameter larger than that of the rotation rod 61 so that the rotation rod 61 can smoothly rotate.

As illustrated in FIG. 2, when the operation unit 65 is arranged on the back surface of the camera rig, the rotation rod 61 needs to pass through the through hole 23. However, when the operation unit 65 is arranged on the front surface, upper end, or lower end of the camera rig, the through hole may not be necessary because it does not intersect the bow body 10.

A first end of the rotation rod 61 is provided with an eye portion 63 through which the bow body 51 passes. The eye portion 63 is formed to allow the bowstring 51 to be wound around or unwound from the rotation rod 61 when the rotation rod 61 rotates so that the tension of the bowstring 51 can be adjusted.

The operation unit 65 transfers rotational motion to the rotation rod 61. The operation unit 65 may include a rotation wheel or a stepping motor.

According to the present embodiment, the operation unit 65 may include a rotation wheel. The rotation wheel is installed at a second end of the rotation rod 61. The rotation rod 61 is rotated by rotating the rotation wheel.

The stepping motor is a motor in which a rotation angle of a rotor is controlled in the unit of a step angle according to on/off operation of current to the motor. When the operation unit 65 uses a stepping motor, the directions of the cameras can be controlled by controlling a focusing control button similar to an operation of controlling a zoom-in and zoom-out button of a camera.

A locking member 67 may be further included to lock the rotated state of the rotation rod 61.

The locking member 67 may include a cogwheel 68 provided on the outer surface of the rotation rod 61 and a locking piece 69 that is engaged with the teeth of the cogwheel 68. When the bowstring 51 is wound around the rotation rod 61, the rotated rotation rod 61 is likely to return to its initial position due to the tension of the bowstring 51. Therefore, the rotated state of the rotation rod 61 has to be locked using the cogwheel 68 and the locking piece 69.

The operation unit 65 and the locking member 67 may be supported in a manner that respective surfaces of the operation unit 65 and the locking member 67 are fixed to the housing of the camera rig. Although the housing is not illustrated, it may take various shapes.

The camera rig for shooting multi-view images and videos that is structured as described above operates in a manner such that when a user rotates the operation unit 65 to rotate the rotation rod 61, the bowstring 51 engaged with the rotation rod 61 is wound around the rotation rod 61 and the latches 53 connected to the bowstring 51 are pulled so that the bow body 10 connected to the latches 53 can be bent.

As illustrated in FIG. 5, the left cam sockets 27 and the right cam sockets 25 are moved away from the central cam socket 21 connected to the bow body 10 according to the bending of the bow body 10. Accordingly, the cameras K fixed to the cam sockets 20 can be directed to the shooting spot according to the bending amount of the bow body 10.

In this case, the bow body 10 is allowed to bend such that all the cameras k can be directed to a subject distanced from the cameras K by a predetermined minimum length m (preferably 4 m). In addition, the elastic force of the bow body 10 is adjusted such that all the cameras K connected to the bow body 10 are always at equiangular intervals (angles $\alpha$ and $\beta$).

On the other hand, when the rotation-lock of the rotation rod 61 is released by using the cogwheel 68 and the locking piece 69 and when the rotation rod 61 is reverse-rotated by rotating the operation unit 65, the bowstring 51 engaged with the rotation rod 61 is unwound from the rotation rod 61 and the pulling force of the latches 53 connected to the bowstring 51 is released. As a result, the bow body 10 is stretched. At this point, since the rubber band 35 that restrains the left and right cam sockets 25 and 27 from moving assists the bow body 10 to be elastically restored, the bow body 10 is stretched straight.

When the bow body 10 is stretched straight, since the cameras K are arranged in parallel with each other, the cameras K can be used to shoot a distant view image and video.

The camera rig for shooting multi-view images and videos according to the second embodiment can automatically perform complicated camera arrangement at a time with a simple operation of bending or stretching the bow body 10.

Figure 6:
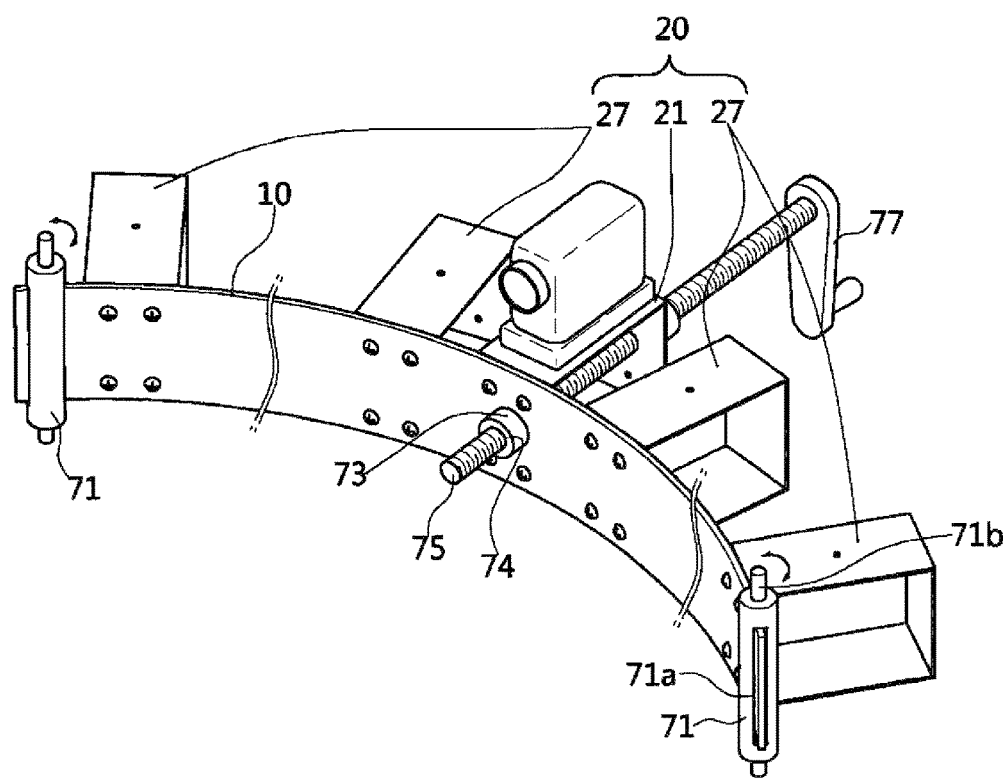
FIG. 6 is a diagram illustrating a camera rig for shooting multi-view images and videos according to a third embodiment of the present invention.

In a camera rig for shooting multi-view images and videos according to a third embodiment, as illustrated in FIG. 6, an adjustment unit may include semi-fixed bodies 71, a moving body 73, a rotation rod 75, and an operation unit 77.

The semi-fixed bodies 71 are semi-fixed to respective ends of a bow body 10. The moving body 73 is attached to a middle portion of the bow body 10 and is engaged with the rotation rod 75 rotated by the operation unit 77, thereby moving at the middle portion of the bow body 10.

That is, the moving body 73 is attached to the middle portion of the bow body 10 and engaged with the rotation rod 75 rotated by the operation unit 77. In this state, when the rotation rod 75 is rotated, the moving body 73 moves along the rotation rod 75 in forward-backward directions. When the moving body 73 moves along the rotation rod 75, the middle portion of the bow body 10 to which the moving body 73 is attached is moved so that the bow body 10 can be bent.

The semi-fixed bodies 71 have respective passages 71a through which the bow body 10 can pass, and the semi-fixed bodies 71 can rotate about their respective rotation shafts 71b.

The semi-fixed bodies 71 rotate by an amount corresponding to the bending amount of the bow body 10 bent by the moving body 73, and the bow body 10 moves through the passages 71a of the semi-fixed bodies 71 by an amount that the bow body 10 is dragged by the moving body 73.

When the bow body 10 is moved along the moving body 73, the semi-fixed body 71 rotates about the rotation shaft 71b by a predetermined angle in a direction indicated by an arrow in the drawings. That is, the semi-fixed bodies 71 help movement and bending of the bow body 10. Therefore, the bow body 10 can be uniformly bent over its full length.

The moving body 73 is engaged with the rotation rod 75 so that it can move along the rotation rod 75. For example, the rotation rod 75 is a screw rod and an inside surface of the moving body 73 that is engaged with the rotation rod 75 is threaded to correspond to the outer surface shape of the screw rod. That is, the moving body 73 has a nut shape.

On the other hand, as illustrated in FIG. 6, the moving body 73 is attached to the middle portion of the bow body 10 and may include a cam socket 21 having a connection hole 74 engaged with the rotation rod 75 that passes through the middle portion of the bow body 10.

Figure 7A:
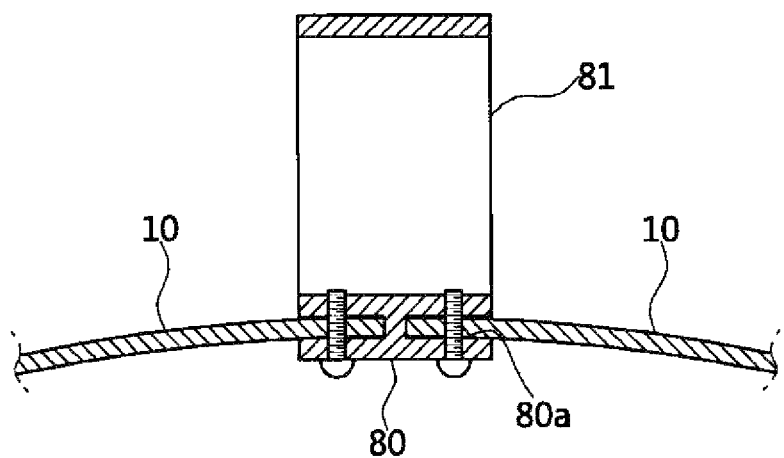
FIGS. 7A and 7B are diagrams illustrating a state in which two camera rigs for shooting multi-view images and videos according to one embodiment of the present invention are connected using a connection member.
Figure 7B:
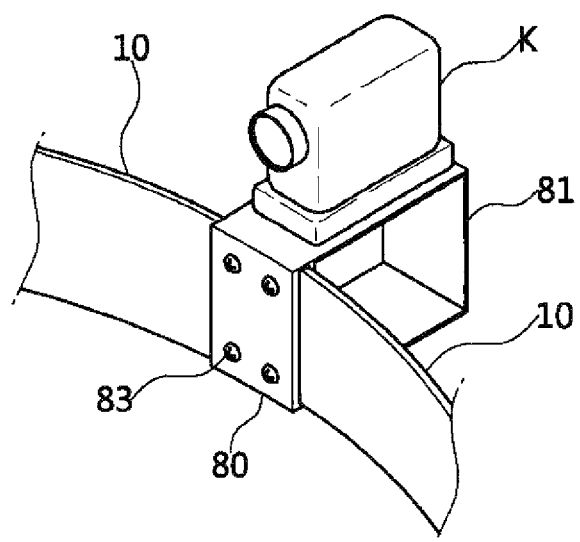

The camera rig for shooting multi-view images and videos described above (hereinafter, referred to as "rig") is structured such that two rigs, a left rig and a right rig, can be connected to each other using a connection member 80 as illustrated in FIGS. 7A and 7B. Two or more rigs can be connected using such a connection member 80.

For example, when it is necessary to shoot 20-point multi-view images and videos using 20 cameras, a rig that can control the 20 cameras is likely to have a large volume and thus is difficult to carry. Therefore, two rigs each of which can mount 10 cameras may be separately used usually and may be connected to each other as necessary. In this case, it is possible to easily carry the rigs.

When two rigs are connected to each other for use, there may be no camera arranged at a position where one bow body 10 is connected to the other bow body 10. In this case, cameras cannot be equidistantly arranged. To solve this problem, an additional cam socket 81 to which a camera K can be mounted is arranged in the connection member 80.

The connection member 80 has insertion recesses 80a at respective side ends thereof, and end portions of the bow bodies 10 can be inserted into the respective insertion recesses 80a. The inserted state of the bow bodies 10 into the respective insertion recesses 80a may be locked using a bolt 83.

Figure 8:
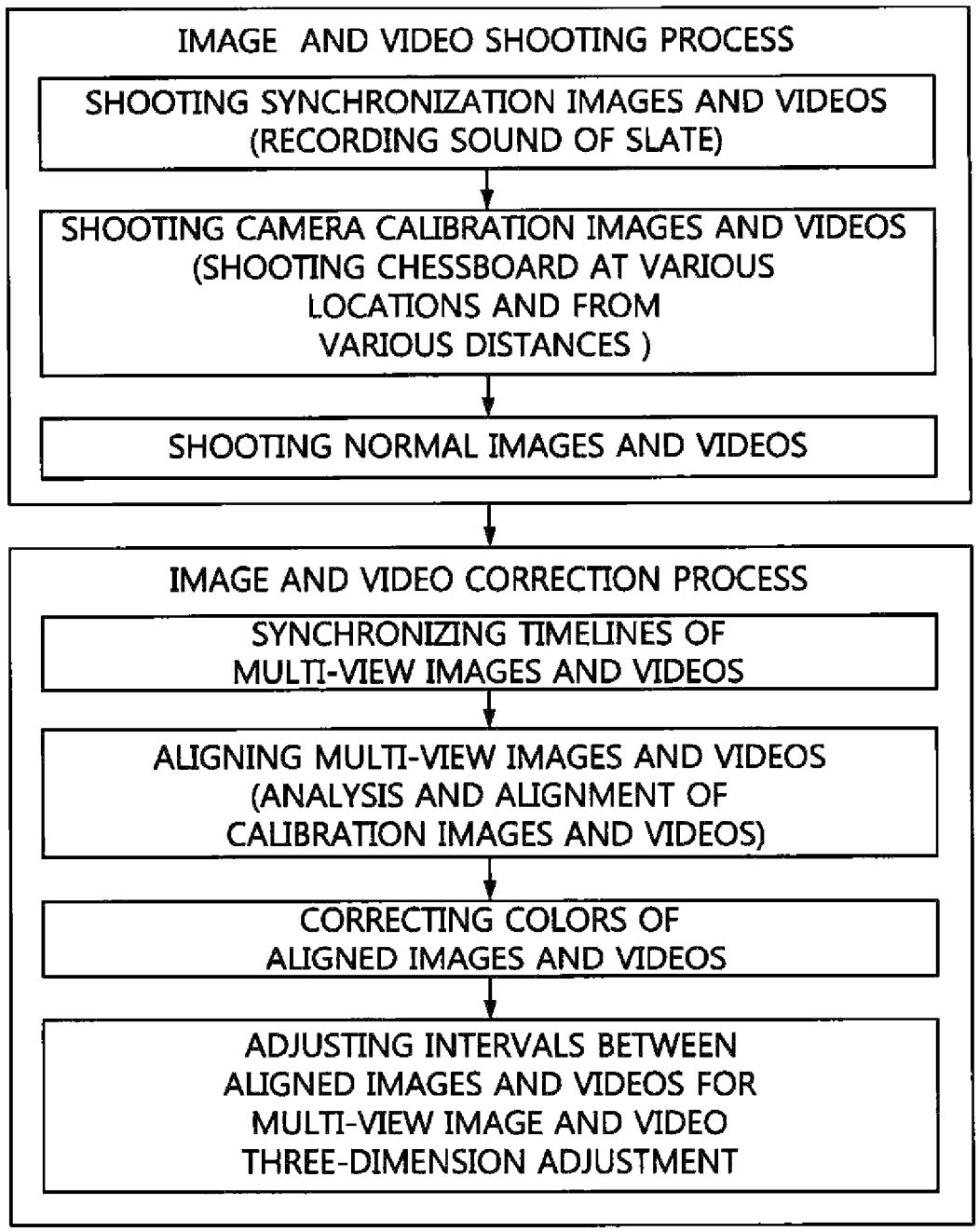
FIG. 8 is a block diagram illustrating an image and video processing method for processing images and videos obtained by a multi-view image and video shooting camera rig according to one embodiment of the present invention.

Next, an image and video processing method that is used with the camera rig for shooting multi-view images and videos according to the preferred embodiments of the invention will be described below. As illustrated in FIG. 8, an image and video processing method according to one embodiment includes the following processes: a multi-view synchronization image and video shooting process of shooting multi-view synchronization images and videos using a slate that indicates a start and an end of shooting; a multi-view camera calibration image and video shooting process of shooting multi-view camera calibration images and videos by shooting a chessboard with a predetermined size at various locations and from various distances; and a normal image and video shooting process of shooting normal images and videos.

Even if the camera rig is precisely structured, there may be an error between images and videos shot by respective cameras due to a fine assembling error between a camera, a cam mount, and a cam socket, or due to non-uniform bending of a bow body, a rotation rate error of a cogwheel, etc.

These mechanical errors are measured through a calibration process that is performed before the image and video shooting process, and can be corrected through the image and video correction process after the image and video shooting process is performed.

In the calibration process, positions and directions, lens distortion, and zoom scale of respective cameras are measured using a camera calibration method in which a chessboard pattern is used. However, it takes a long time for precise measurement. Therefore, simple and minimum calibration that takes a short time is performed in the embodiment of the invention, instead of precise calibration.

In the image and video shooting process, directions of all cameras are simultaneously adjusted using a camera rig for shooting multi-view images and videos and then the image and video shooting is performed.

Next, sound, images and videos are synchronized using a slate that is used to indicate a start and an end of shooting of an image and video.

In the image and video correction process, image and video correction is performed on images and videos obtained through the image and video shooting.

The image and video correction process is performed by designating any one image and video selected from among obtained images and videos as a reference image and video.

The image and video shot by a camera arranged in the central cam socket can be designated as the reference image and video. When the reference image and video have a severe error, an image and video shot by a camera arranged in a left cam socket or a right cam socket adjacent to the central cam socket may be used as the reference image and video. Errors of images and videos shot by the respective cameras can be corrected by comparing the images and videos and the reference image and video with each other.

The image and video correction process may include a step of analyzing multi-view synchronization images and videos and performing timeline synchronization of the multi-view images and videos, a step of analyzing multi-view camera calibration images and videos and performing an image and video alignment operation of producing aligned multi-view images and videos, a color correction step of correcting colors of the aligned images and videos, and a multi-view image and video three-dimension adjustment step of adjusting intervals between the aligned images and videos.

In the image and video timeline synchronization step, an error between start times of images and videos shot by all the cameras is corrected. Although many cameras simultaneously perform image and video shooting, a subtle error between start times of images and videos may occur due to a mechanical error. Therefore, a difference between start times of the shot images and videos are corrected.

In the image and video timeline synchronization step, start times of shot images and videos are corrected with respect to the sound "start" of a slate that is recorded during image and video shooting.

In addition, although all cameras try to shoot images and videos at the same time, an error may occur in shooting speed of the respective cameras. Therefore the number of frames that are shot by the cameras may vary. Therefore, in the image and video timeline synchronization step, the number of frames within a period ranging the sound "start" to the sound "end" of the slate is inspected and is corrected to be uniform for each camera.

In the camera calibration image and video analysis step, the value of lens distortion is calculated through analysis of camera calibration images and videos, and then the position, rotation angle and scale value of each camera are calculated. The distorted image and video are corrected using the calculated value of the lens distortion.

In an image and video zoom correction step, when the images and videos shot by the respective cameras are enlarged or reduced in comparison with the reference image and video, automatic correction is performed such that the calculated scale values of the respective camera are leveled and the images and videos are reverse-rotated.

In an image and video rotation correction step, when images and videos shot by the respective cameras are rotated with respect to the reference image and video, automatic correction is performed such that the calculated rotation values of the respective cameras are used to reverse-rotate the images and videos.

In a horizontal position correction step, the calculated positions and rotation values of the cameras are analyzed and the horizontal positions of the images and videos are automatically corrected. Since all the cameras shot a subject at the same height, the horizontal positions of the images and videos have to be identical to each other. However, since there may be a mechanical error, there may be an error in horizontal positions of images and videos. Therefore, the horizontal positions of the images and videos are corrected.

In a color correction step, brightness and contrast are adjusted to be uniform for each image and video. Brightness and contrast may differ for each camera due to a difference in lighting environment. Therefore, images and videos shot by the central camera and the cameras disposed at the leftmost and rightmost positions may differ in brightness due to a difference in directions of the cameras even under the same lighting environment. Accordingly, brightness and contrast of images and videos are corrected to be uniform.

In a three-dimensional image and video forming step, vanishing points (converged positions) of images and videos are adjusted. When images and videos are shot in a state in which the cameras are arranged in parallel with each other, the vanishing point is in an infinite depth in a three-dimensional image and video. Therefore, there is only a sense of volume in which all objects in the image and video protrude. Therefore, the vanishing point is adjusted to a specific position in a short distance (by moving all images and videos to a center point serving as a reference point).

When performing convergence shooting with cameras, there may be a keystone error (convergence error) by which a left to right ratio of images and videos varies from image and video to image and video. When the vanishing point is very near, the keystone error is severe. For example, when shooting a rectangular object, a phenomenon that a left side of the rectangular object appears longer in an image and video shot from the left side of the rectangular object but appears shorter in an image and video shot from the right side of the rectangular object is visually confirmed. Therefore a three-dimensional effect is deteriorated. This keystone error is solved through image and video correction of vanishing-point adjustment.

After the image and video correction are completed, areas other than common area of the all images and videos are cut away and the common area is enlarged.

After the image and video correction process is performed, a peripheral portion of an image and video are cut or distorted. Therefore, peripheral portions of the images and videos are difficult to use Therefore, distorted peripheral portions of the images and videos are cut away, and the remaining portions of the images and videos are scaled up to their original size.

In the case of using the image and video processing method described above, since it is possible to simultaneously adjust all the cameras at the same time, it is possible to easily and promptly obtain multi-view images and videos by performing only a simple calibration process.

According to the image and video processing method, it is possible to easily and promptly obtain multi-view images and videos since it is possible to simultaneously adjust all cameras at the same time and only a simple calibration process is necessarily included.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A camera rig for shooting multi-view images and videos, comprising:
    a plurality of cam sockets;
    a plurality of cam mounts for fixing a plurality of cameras to the plurality of cam sockets; and
    an adjuster that adjusts the cam sockets such that the plurality of cameras are directed to a subject,
    wherein the adjuster comprises:
    a bow body made of an elastically deformable material;
    a rotation rod rotated by an operator;
    a moving body that is attached to a middle portion of the bow body, is engaged with the rotation rod, and moves along the rotation rod in forward-backward directions when the rotation rod rotates; and
    semi-fixed bodies that are formed to semi-fix both ends of the bow body to the adjuster and assist the bow body to bend when the moving body moves.

2. The camera rig of claim 1, wherein the adjuster further comprises:
    a stepping motor connected to the cam sockets to rotate the cam sockets;
    the operator that determines a distance between each of the cameras and the subject based on a rotation amount thereof; and
    a controller that detects the rotation amount of the operator and controls a rotation amount of the stepping motor based on the rotation amount of the operator.

3. The camera rig of claim 2,
    wherein the operator comprises a wheel, a rotation amount of which is adjusted by a user, and
    wherein the operator converts the rotation amount of the wheel into a distance between each of the cameras and the subject and sends the distance to the controller as an input signal.

4. The camera rig of claim 2, wherein the controller calculates a rotation amount of each of the cam sockets based on the distance sent as the input signal such that the cameras are directed to the subject, and rotates the stepping motor connected to the cam sockets by the calculated rotation amount.

5. The camera rig of claim 1, wherein:
    the cam sockets are arranged at regular intervals along one surface of the bow body, and
    only one surface of each of the cam sockets is fixed to the bow body so that the intervals between, the cam sockets are adjustable according to deformation of the bow body.

6. A camera rig for shooting multi-view images and videos, comprising:
    a plurality of cam sockets;
    a plurality of cam mounts for fixing a plurality of cameras to the plurality of cam sockets; and an adjuster that adjusts the cam that the plurality of cameras are directed to a subject, wherein the adjuster comprises:

a bow body made of an elastically deformable material;

latches mounted to both ends of the bow body;

a bowstring engaged with the latches;

a rotation rod connected to a middle portion of the bowstring to adjust tension of the bowstring; and an operator that transfers rotational motion to the rotation rod, and wherein the cam sockets are arranged at regular intervals along one surface of the bow body, and only one surface of each of the cam sockets is fixed to the bow body so that the intervals between the cam sockets are adjustable according to deformation of the bow body.

* * * * *